United States Patent

Shashlo et al.

[11] Patent Number: 5,829,123
[45] Date of Patent: *Nov. 3, 1998

[54] APPARATUS AND METHOD FOR SETTING VEHICLE DOOR GLASS TO VEHICLE BODY

[75] Inventors: Michael L. Shashlo, Livonia; Steven A. Tracy, Westland, both of Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 777,769

[22] Filed: Oct. 9, 1996

Related U.S. Application Data

[62] Division of Ser. No. 286,311, Aug. 5, 1994, abandoned.

[51] Int. Cl.[6] .................................................. B23Q 15/00
[52] U.S. Cl. .............................. 29/703; 29/281.6; 29/714
[58] Field of Search .............................. 29/281.4, 281.5, 29/281.6, 407, 434, 464, 466, 468, 701, 702, 703, 709, 714

[56] References Cited

U.S. PATENT DOCUMENTS

| 4,375,716 | 3/1983 | Armstrong et al. |
| 4,670,974 | 6/1987 | Antoszewski et al. ............... 29/703 X |
| 4,789,417 | 12/1988 | Komatsu et al. ..................... 29/714 X |
| 4,885,833 | 12/1989 | Umegai et al. .......................... 29/407 |

FOREIGN PATENT DOCUMENTS

| 3842331 | 1/1990 | Germany . |
| 3-67788 | 3/1991 | Japan ....................................... 29/714 |

Primary Examiner—Joseph M. Gorski
Attorney, Agent, or Firm—Daniel M. Stock, Esq.

[57] ABSTRACT

An apparatus and method for setting a door glass of a vehicle door to a vehicle body includes a frame for attachment to an inner panel of a vehicle door, at least one slide assembly to engage a vehicle body and to move a door glass of the vehicle door, and at least one locator on the slide assembly to locate and set the door glass relative to the vehicle body.

10 Claims, 4 Drawing Sheets

APPARATUS AND METHOD FOR SETTING VEHICLE DOOR GLASS TO VEHICLE BODY

This is a division of U.S. patent application Ser. No. 08/286.311, filed Aug. 5, 1994 and now abandoned.

BACKGROUND OF THE INVENTION

1. Field of the Invention

The present invention relates generally to vehicle doors and, more specifically, to an apparatus and method for setting door glass of a vehicle door to a vehicle body.

2. Description of the Related Art

It is known to provide vehicles such as automotive vehicles with a door having a frameless design. In this type of vehicle door, glass for a window of the vehicle door has no frame around it and the door glass is free-standing to mate with the body of the vehicle. During production of the vehicle, the vehicle door is attached to the vehicle body as the vehicle moves along an assembly line. Typically, an operator enters the vehicle body, closes the vehicle door and locates the door glass to the vehicle body through an interactive technique. Once located, the operator then secures the door glass to the vehicle door, opens the vehicle door and exits the vehicle body. Although this assembly has worked well, it suffers from the disadvantages that the operator has to enter the vehicle body and the ergonomics of assembly are poor on the operator.

To overcome these disadvantages during production of the vehicle, it is known to take the vehicle door off the vehicle body and from the assembly line to a remote assembly station. In the remote assembly station, the vehicle door is placed in a support structure and a fixture is moved by an operator for attachment to the vehicle door. Once the fixture is attached to the vehicle door, the operator adjusts the door glass to the vehicle door via blocks and secures the door glass to the vehicle door. Although this remote assembly has worked well to improve ergonomics of assembly on the operator, it suffers from the disadvantage that the remote assembly does not transfer the position of the vehicle body to the vehicle door for setting the door glass relative to the vehicle body.

SUMMARY OF THE INVENTION

Accordingly, the present invention is an apparatus for setting a door glass of a vehicle door to a vehicle body. The apparatus includes a frame for attachment to an inner panel of a vehicle door and at least one slide assembly mounted on the frame to engage a vehicle body and to move a door glass of the vehicle door relative to the vehicle body. The apparatus also includes at least one locator on the slide assembly to locate and set the door glass relative to the vehicle body.

Additionally, the present invention is a method for setting a door glass of a vehicle door to a vehicle body. The method includes the steps of attaching a frame to an inner panel of a vehicle door, engaging a vehicle body with at least one slide assembly mounted on the frame and moving a door glass of the vehicle door relative to the vehicle body. The method also includes the steps of locating the door glass with at least one locator on the slide assembly and setting the door glass relative to the vehicle body.

One feature of the present invention is that an apparatus and method are provided for setting a door glass of a vehicle door to a vehicle body. Another feature of the present invention is that the apparatus is utilized on a moving assembly line for setting the door glass relative to the vehicle body. Yet another feature of the present invention is that the apparatus locates two points in spacial x,y,z directions from the vehicle body and transfers these points to the vehicle door for setting the door glass relative to the vehicle body. Still another feature of the present invention is that the apparatus and method allow the operator to stay outside the vehicle body to set the door glass. A further feature of the present invention is that the apparatus and method improve the ergonomics on the operator and can be performed at assembly line speeds. Yet a further feature of the present invention is that the apparatus and method provide more accurate setting of the door glass to the vehicle body to reduce wind/noise and water entry. Yet another feature of the present invention is that the apparatus is utilized to spacially identify the relationship of the vehicle door to the vehicle body.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
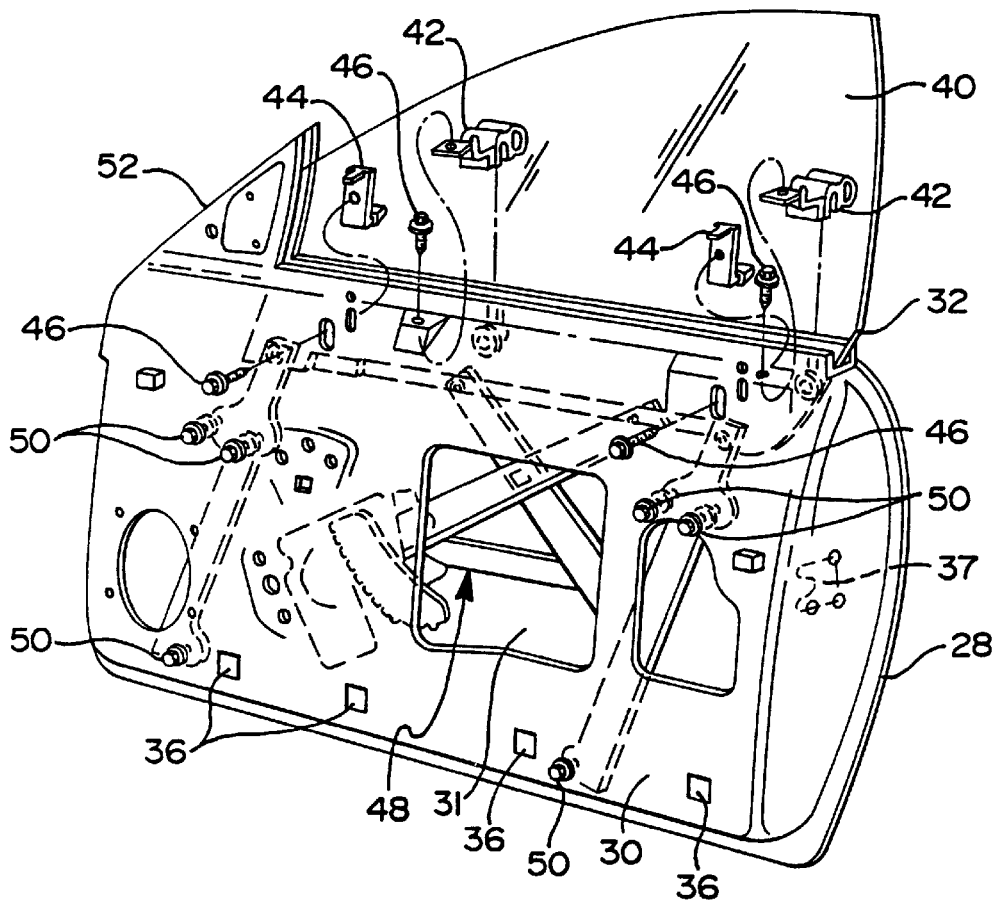
FIG. 1 is a perspective view of a vehicle door for use in an apparatus, according to the present invention, for setting door glass of the vehicle door to a vehicle body.
Figure 2:
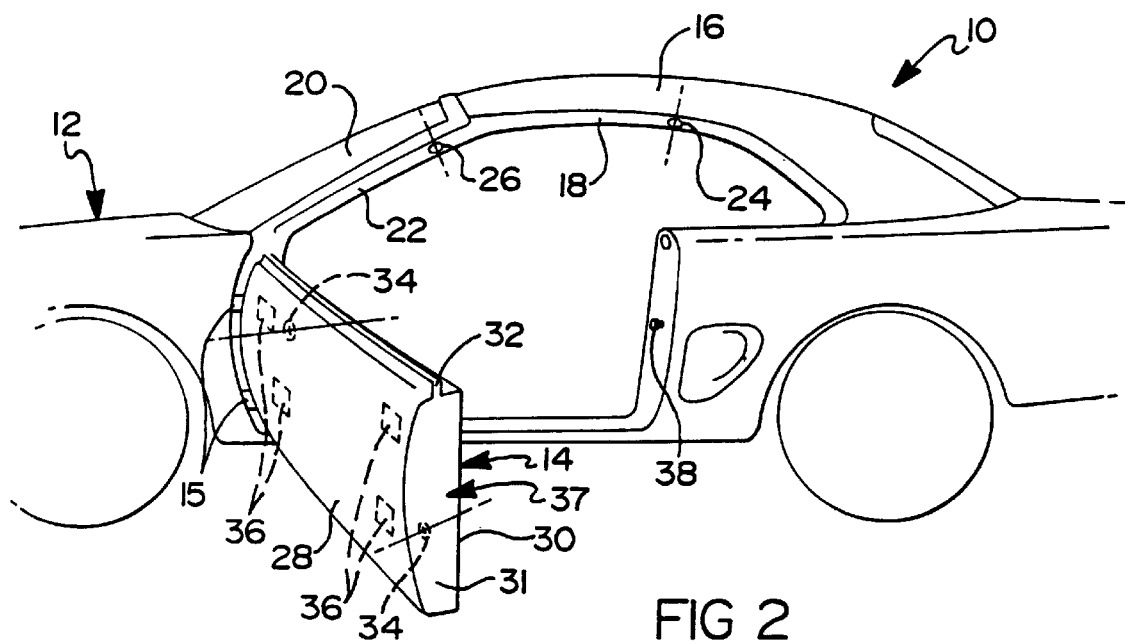
FIG. 2 is an elevational view of the vehicle door of FIG. 1 with the door glass removed and illustrated in operational relationship with a vehicle body.

Referring to the drawings and in particular to FIGS. 1 and 2, a vehicle 10 such as an automotive vehicle includes a vehicle body, generally indicated at 12, and a vehicle door, generally indicated at 14, pivotally attached to the vehicle body 12 by suitable means such as hinges 15. The vehicle body 12 includes a roof 16 having a roof rail 18 and a front windshield 20 having a pillar 22. The roof rail 18 and pillar 22 have a locator opening 24 and 26, respectively, for a function to be described.

Figure 7:
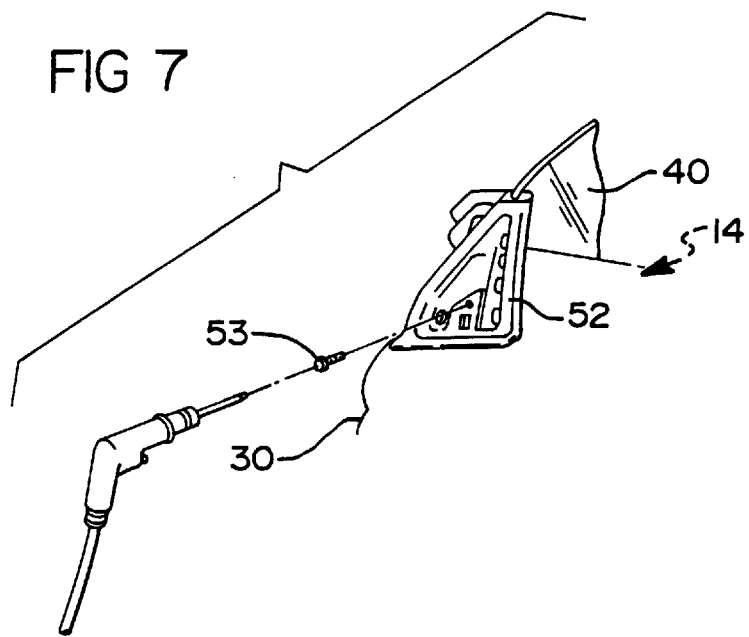
FIG. 7 is a partial perspective view of a portion of the vehicle door of FIG. 3.

The vehicle door 14 includes an outer panel 28 and an inner panel 30 joined together and forming a space 31 therebetween. The vehicle door 14 also includes an aperture 32 at an upper end thereof. The inner panel 30 has a plurality of control openings 34 and a plurality of control surfaces 36 for a function to be described. The vehicle door 14 includes a door latch 37 for engagement with a door striker 38 attached to the vehicle body 12 to releasably latch the vehicle door 14 to the vehicle body 12 in a closed position. The vehicle door 14 further includes a door glass 40 made of a transparent material such as glass or plastic and disposed between the outer panel 28 and inner panel 30 for movement in and out of the space 31 as is known in the art. The door glass 40 is located to the vehicle door 14 by suitable means such as stabilizer brackets 42 and up-stops 44 secured to the inner panel 30 by suitable means such as fasteners 46. The vehicle door 14 includes a door window regulator mechanism, generally indicated at 48, for raising and lowering the door glass 40. The door window regulator mechanism 48 is secured to the door glass 40 and inner panel 30 by suitable means such as fasteners 50. The vehicle door 14 may include a sail 52 located longitudinally forward adjacent the door glass 40. The sail 52 is adjustable longitudinally relative to the inner panel 30 as illustrated in FIG. 7. The sail 52 is secured to the inner panel 30 by suitable means such as fasteners 53. It should be appreciated that the vehicle door 14 is conventional.

Referring to FIGS. 3 through 8, an apparatus, generally indicated at 54 and according to the present invention, is illustrated for setting the door glass 40 relative to the vehicle body 12. The apparatus 54 includes a frame, generally indicated at 56, for attachment to the vehicle door 14. The frame 56 includes a base member 58 extending generally longitudinally and a leg member 60 extending generally vertically or downwardly near each end of the base member 58. Each leg member 60 has at least one locating block 62 for mating engagement with the control surfaces 36 of the inner panel 30. The frame 56 also includes a plurality of support members 64 interconnecting the base member 58 and leg members 60 to strengthen the same. The frame 56 further includes at least one locating pin 66 on each leg member 60 for mating engagement with the control openings 34 of the inner panel 30. It should be appreciated that the locating blocks 62 and locating pins 66 locate the apparatus 54 relative to the vehicle door 14.

The apparatus 54 includes, at least one, preferably a plurality of clamps, generally indicated at 68, for securing the frame 56 to the inner panel 30. The clamps 68 have a clamping member 70 and a cylinder 72 such as a pneumatic cylinder for moving the clamping member 70 to engage and disengage the inner panel 30. It should be appreciated that the cylinder 72 is connected to a source of power (not shown) such as air.

The apparatus 54 also includes an attachment member 74 attached to the base member 58. The attachment member 74 has an inverted "U" shape. The apparatus 54 includes a torque bar 76 pivotally attached at one end to the attachment member 74. The torque bar 76 has another end fixedly attached to a power or air balance assist lift, generally indicated at 78. The power assist lift 78 allows the apparatus 54 to be easily lifted and moved by an operator. It should be appreciated that the power assist lift 78 is conventional.

The apparatus 54 further includes a plurality, preferably a pair, of slide packages or assemblies, generally indicated at 80. Each slide assembly 80 includes a mounting plate 82 secured to the base member 58. Each slide assembly 80 also includes a gauge pin 84 which is movably connected to a toggle arm 86. The toggle arm 86 is pivoted or rotated to slide the gauge pins 84 into and out of engagement with the locator openings 24 and 26. Each slide assembly 80 includes an up-stop locator 88 for locating the Hi/Low setting of the door glass 40 as is known in the art. Each slide assembly 80 further includes a trap block 90 pivotally attached to a rocker arm 92 to determine the In/Out setting of the door glass 40 as is known in the art. It should be appreciated that the slide assemblies 80 are moveable in three axes and are of the type commercially available from "THK" SLIDE BEARINGS, Detroit, Mich.

Figure 3:
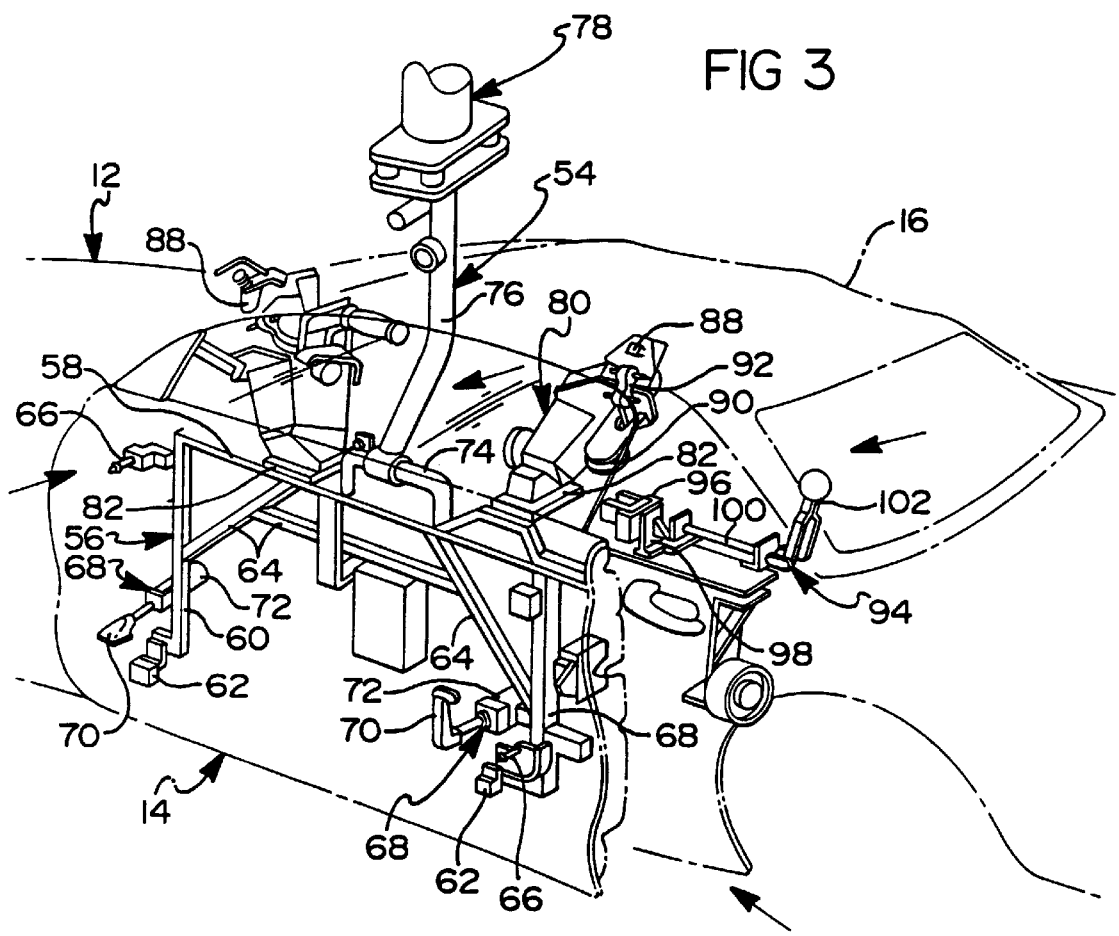
FIG. 3 is a perspective view of an apparatus, according to the present invention, for setting the door glass and illustrated in operational relationship with the vehicle door and vehicle body of FIGS. 1 and 2.
Figure 4:
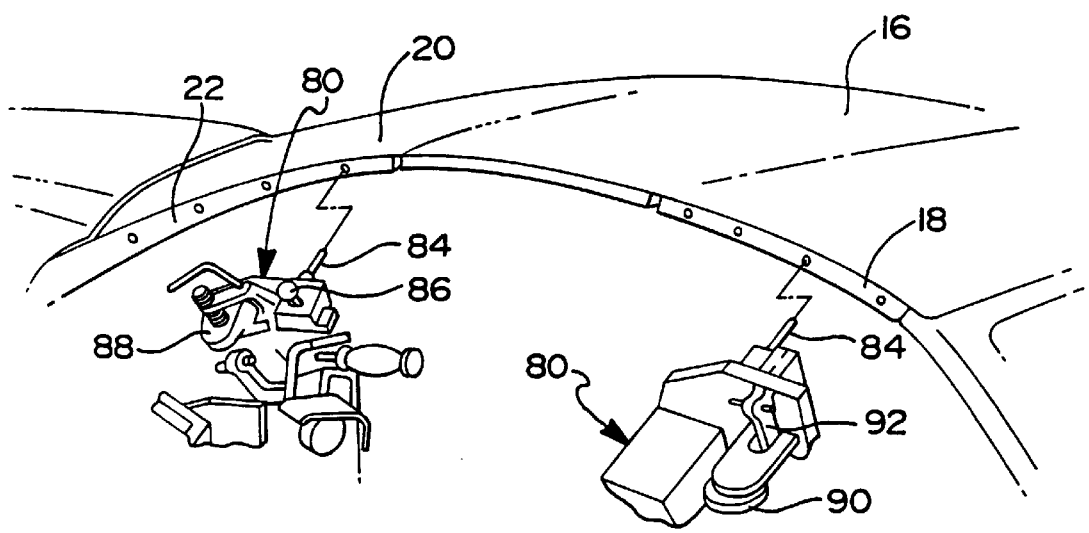
FIG. 4 is a partial perspective view of a portion of the apparatus and vehicle body of FIG. 3.
Figure 5:
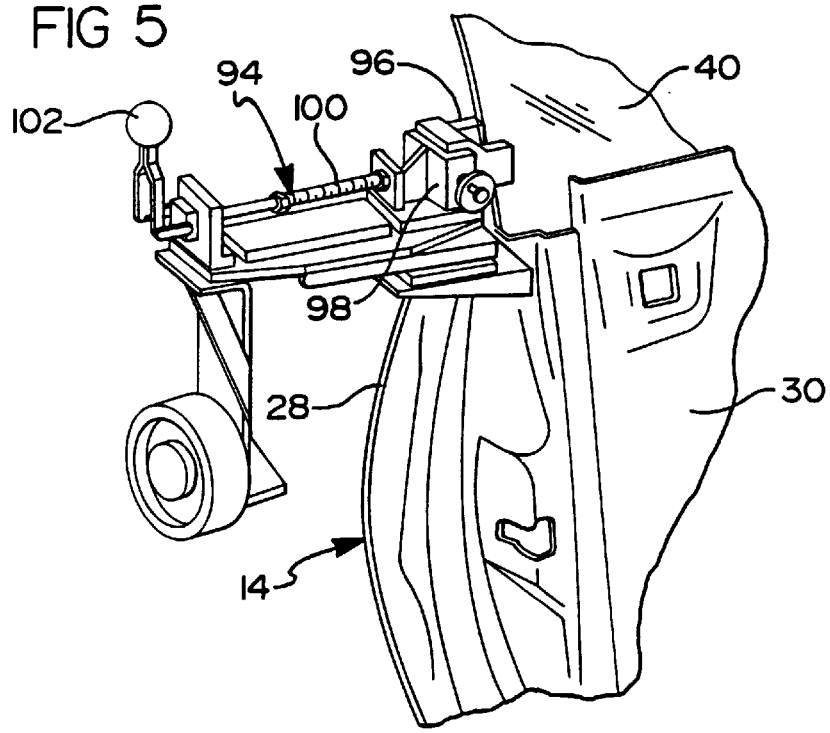
FIG. 5 is a partial perspective view of another portion of the apparatus and vehicle body of FIG. 3.
Figure 6:
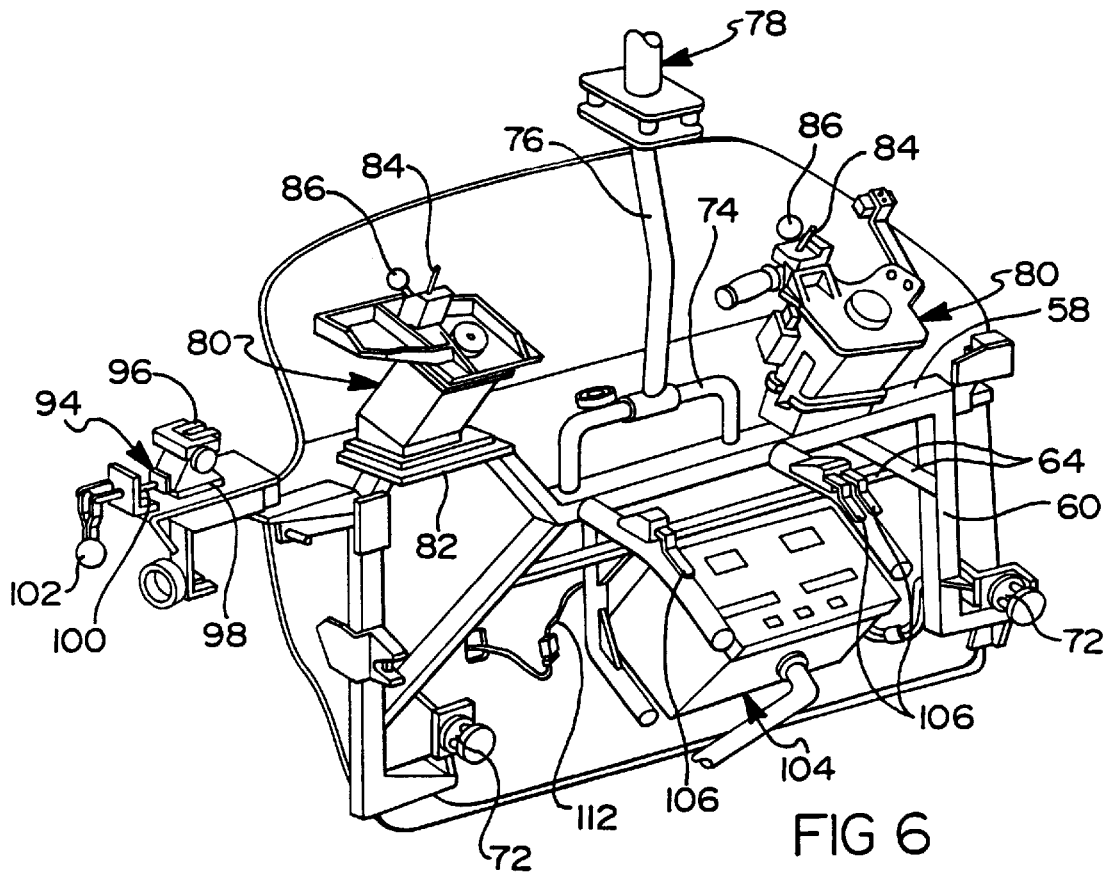
FIG. 6 is a perspective view of the apparatus and vehicle door of FIG. 3.

Referring to FIGS. 3, 5 and 6, the apparatus 54 includes an adjustment device, generally indicated at 94, for adjusting the In/Out setting of the door glass 40. The adjustment device 94 includes an adjustment block 96 pivotally connected to a support block 98. The adjustment device 94 also includes a slide member 100 attached to the support block 98 and a toggle arm 102 attached to the slide member 100. The toggle arm 102 is pivoted to slide the slide member 100 longitudinally into and out of engagement with the door glass 40. It should be appreciated that the adjustment block 96 may be rotated to move the door glass 40 in and out relative to the vehicle body 12.

Figure 8:
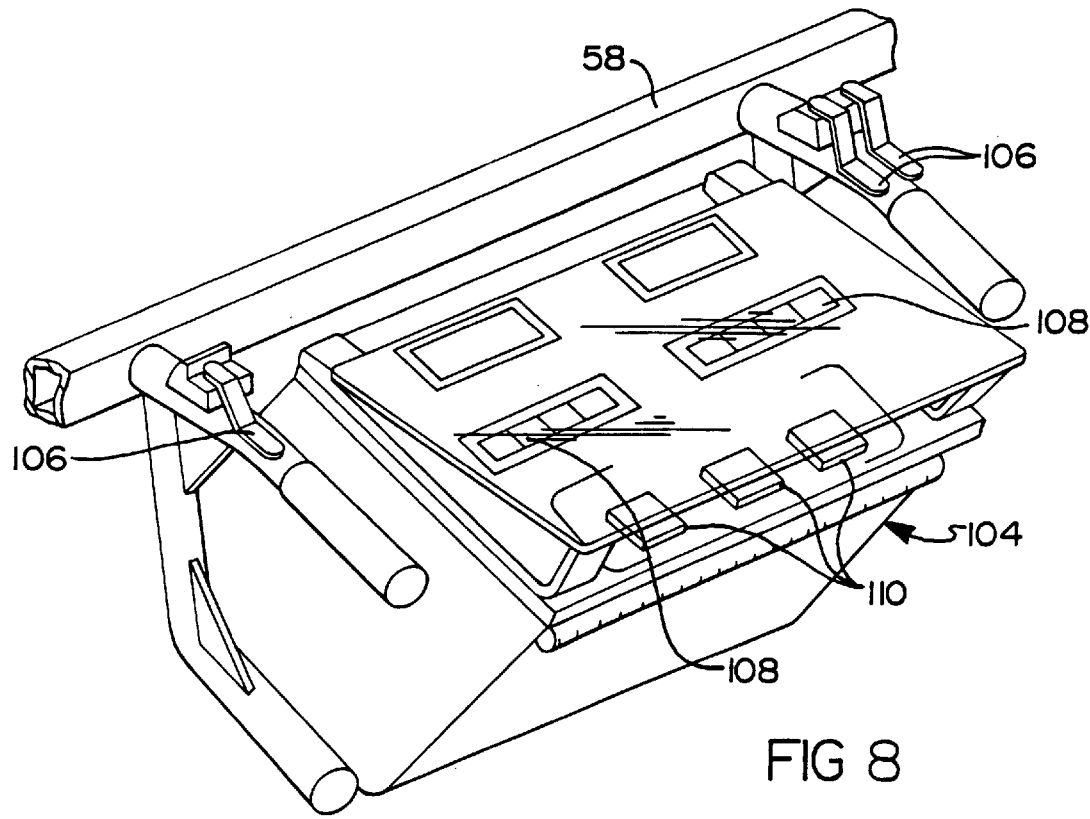
FIG. 8 is a partial perspective view of a portion of the apparatus of FIG. 3.

As illustrated in FIGS. 3, 6 and 8, the apparatus 54 includes a control box, generally indicated at 104, for controlling the slide assemblies 80. The control box 104 includes a microprocessor (not shown) and is attached to the base member 58 of the frame 56. The microprocessor controls the movement of the slide assemblies 80 and determines the In/Out setting of the door glass via an input from the rocker arm 92. The control box 104 includes buttons 106 for actuating the clamps 68 to clamp and unclamp the frame 56 to the vehicle door 14. The control box 104 also includes displays 108 to provide a display or readout of information from the microprocessor. The control box 104 also includes buttons 110 to move the slide assemblies 80 and raise and lower the door glass 40. It should be appreciated that the control box 104 is commercially available from KemKraft Engineering, Inc. of Livonia, Mich.

In operation, the operator uses the power assist lift 78 to move the apparatus 54 adjacent the inner panel 30 of the vehicle door 14. The operator locates the control blocks 62 and control pins 66 relative to the control surfaces 36 and control openings 32, respectively. The operator clamps the frame 56 to the inner panel 30 via the clamps 68 by actuating the buttons 106 on the control box 104. The operator then connects a power wire 112 (FIG. 6) from the control box 104 to the door window regulator mechanism 48. The operator then closes the vehicle door 14 such that the door latch 37 engages the door striker 38. The operator then moves the toggles 86 on the slide assemblies 80 to move the gauge pins 84 into engagement with the locator openings 24 and 26. The operator then adjusts and secures the sail 52 to the inner panel 30 as illustrated in FIG. 7.

After the sail 52 is secured, the operator moves the toggle 102 to close the adjustment block 96 on the door glass 40. The operator retracts the gauge pins 84 by moving the toggles 86 and opens the vehicle door 14. The operator then moves the door glass 40 upward by actuating a button 110 on the control box 104 to allow power from the control box 104 to the door window regulator mechanism 48. The door glass 40 is moved upward until it hits the blocks 88 to set the Hi/Low position of the door glass 40. The operator tightens the fasteners 46 to the up-stops 49 to secure the door glass 40 to the door window regulator mechanism 48.

After the up-stops 49 are secured, the operator then reads the displays 110 on the control box 104. If the control box 104 displays the correct In/Out setting of the door glass 40 via the rocker arms 92, the operator tightens the fasteners 46 to the stabilizer brackets 42 to set the In/Out position of the door glass 40. However, if the control box 104 displays the incorrect In/Out setting of the door glass 40 via the rocker arms 92, the operator rotates the adjustment block 96 until the correct setting is displayed. The operator then tightens the fasteners 46 to the stabilizer brackets 42 to set the In/Out position of the door glass 40. The door glass 40 is moved downward by actuating another button 110 on the control box 104 to allow power to the door window regulator mechanism 48. The operator then actuates the buttons 106 on the control box 104 to unclamp the clamps 68 and removes the frame 56 from the vehicle door 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for setting a door glass of a vehicle door to a vehicle body comprising:

a frame for attachment to an inner panel of a vehicle door, said frame including means for mating engagement with either one of control surfaces and control openings of the inner panel of the vehicle door;

at least one slide assembly mounted on said frame to engage a vehicle body and to move a door glass of the vehicle door, said at least one slide assembly comprising a gauge pin and a toggle arm movably connected to said gauge pin to slide said gauge pin into and out of engagement with at least one locator opening in the vehicle body to locate said at least one slide assembly relative to the vehicle body to maintain a relative location of the inner panel to the vehicle body; and at least one locator on said at least one slide assembly to locate and set the door glass relative to the vehicle body.

2. The apparatus as set forth in claim 1 wherein said at least one locator comprises an up-stop locator for locating a Hi/Low setting of the door glass relative to the vehicle door.

3. The apparatus as set forth in claim 1 wherein said at least one locator comprises a trap block to determine an In/Out setting of the door glass relative to the vehicle door.

4. The apparatus as set forth in claim 3 including a control device for moving said at least one slide assembly and displaying the position of the door glass relative to the vehicle body.

5. The apparatus as set forth in claim 1 including an adjustment device for adjusting the In/Out setting of the door glass relative to the vehicle door.

6. The apparatus as set fort in claim 1 including at least one clamp for clamping said frame to the inner panel.

7. The apparatus as set forth in claim 1 wherein said means comprises at least one control block on said frame to locate said frame relative to said inner panel.

8. The apparatus as set forth in claim 1 wherein said means comprises at least one control pin on said frame to locate said frame relative to the inner panel.

9. The apparatus as set forth in claim 1 including a torque bar to pivotally attach said frame to a power assist lift.

10. An apparatus for setting a door glass of a vehicle door to a vehicle body comprising:

frame means for attaching to an inner panel of a vehicle door;

slide means mounted on said frame means for engaging a vehicle body and for moving up/down and in/out a door glass of the vehicle door; and locator means on said slide means for locating and setting the door glass relative to the vehicle body.

* * * * *